(12) United States Patent
Fu et al.

(10) Patent No.: US 12,165,341 B2
(45) Date of Patent: Dec. 10, 2024

(54) OPTICAL RESOLUTION MEASUREMENT METHOD FOR OPTICAL DEVICES

(71) Applicant: Applied Materials, Inc., Santa Clara, CA (US)

(72) Inventors: Jinxin Fu, Fremont, CA (US); Yangyang Sun, San Jose, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 272 days.

(21) Appl. No.: 17/534,167

(22) Filed: Nov. 23, 2021

(65) Prior Publication Data

US 2022/0164972 A1 May 26, 2022

Related U.S. Application Data

(60) Provisional application No. 63/189,562, filed on May 17, 2021, provisional application No. 63/117,578, filed on Nov. 24, 2020.

(51) Int. Cl.
*G06T 7/521* (2017.01)
*G06T 1/00* (2006.01)

(52) U.S. Cl.
CPC ............. *G06T 7/521* (2017.01); *G06T 1/0007* (2013.01); *G06T 2207/20056* (2013.01)

(58) Field of Classification Search
CPC ................... G06T 7/521; G06T 1/0007; G06T 2207/20056; G06T 5/003; G06T 5/20;
(Continued)

(56) References Cited

U.S. PATENT DOCUMENTS 5,191,621 A * 3/1993 Brok .................. H04N 5/32
382/280
5,557,097 A * 9/1996 Ortyn .................. G02B 21/241
348/E7.086
(Continued)

FOREIGN PATENT DOCUMENTS

DE 102017009334 B3 3/2019
EP 1241461 A2 9/2002
(Continued)

OTHER PUBLICATIONS

International Search Report/Written Opinion issued to PCT/US2021/060501 on Mar. 11, 2022.
(Continued)

*Primary Examiner* — Manav Seth
(74) *Attorney, Agent, or Firm* — Patterson + Sheridan, LLP

(57) ABSTRACT

Embodiments herein provide for a method of determining an optical device modulation transfer function (MTF). The method described herein includes projecting a baseline image of a pattern from a light engine to a detector. The baseline image is analyzed to determine a baseline function. A baseline fast Fourier transform (FFT) or a baseline MTF of the baseline function is obtained. The method further includes projecting an image of the pattern from the light engine to one or more optical devices. The pattern is outcoupled from the one or more optical devices to the detector. The image is analyzed to determine a function. A function FFT or a function MTF is obtained corresponding to the image. An optical device MTF of the one or more optical devices is determined by comparing the baseline FFT and the function FFT determined by analyzing the image or by comparing the baseline MTF and the function MTF determined by analyzing the image.

20 Claims, 4 Drawing Sheets

(58) Field of Classification Search
CPC .......... G06T 2207/10024; G06T 5/10; G06T 5/002; G06T 2207/10032; G06T 7/13; G06T 2207/30168; G06T 7/0002; G06T 5/006; G06T 5/50; G06T 2207/20024; G06T 7/0004; G06T 3/4007; G06T 3/4053; G06T 2207/20192; G06T 2207/20012; G06T 2200/21; G06T 2207/30176; G06T 5/40; G06T 5/009; G06T 5/00; G06T 7/66; G06T 2207/10008; G06T 5/004; G06T 5/007; G06T 7/80; G06T 7/90; G06T 11/005; G06T 2207/10016; G06T 3/40; G06T 7/136; G06T 2207/10081; G06T 2207/10116; G06T 7/0012; G06T 7/11; G06T 7/12; G06T 1/0021; G06T 2207/10048; G06T 2207/30108; G06T 7/001; G06T 7/20; G06T 7/70; G06T 2200/28; G06T 2207/10121; G06T 2207/20081; G06T 2207/30101; G06T 2211/436; G06T 7/50; G06T 2207/20021; G06T 2207/20104; G06T 2207/20221; G06T 2207/20224; G06T 3/403; G06T 7/337; G06T 17/00; G06T 2200/24; G06T 2207/10036; G06T 2207/20076; G06T 3/4038; G06T 1/00; G06T 1/20; G06T 1/60; G06T 2207/10004; G06T 2207/20032; G06T 2207/20048; G06T 2207/20172; G06T 2207/20201; G06T 2207/30041; G06T 5/008; G06T 7/194; G06T 7/42; G06T 9/007; G06T 2207/10012; G06T 2207/10056; G06T 2207/30181; G06T 3/4092; G06T 7/187; G06T 7/35; G06T 7/60; G06T 7/97; G06T 9/00; G06T 9/005; G06T 17/05; G06T 2201/0601; G06T 2207/30004; G06T 2207/30204; G06T 2207/30252; G06T 3/4023; G06T 3/4084; G06T 7/00; G06T 7/10; G06T 7/30; G06T 7/33; G06T 7/73; G06T 7/74; G06T 7/75; G06T 11/006; G06T 19/006; G06T 19/20; G06T 2200/04; G06T 2207/10028; G06T 2207/10088; G06T 2207/10148; G06T 2207/20004; G06T 2207/20064; G06T 2207/20084; G06T 2207/30144; G06T 2207/30164; G06T 2207/30184; G06T 2207/30192; G06T 2207/30248; G06T 3/4076; G06T 5/30; G06T 7/593; G06T 7/85; G06T 1/0014; G06T 1/005; G06T 11/001; G06T 11/008; G06T 11/60; G06T 17/10; G06T 2201/0051; G06T 2201/0061; G06T 2201/0065; G06T 2207/10052; G06T 2207/10068; G06T 2207/10072; G06T 2207/10152; G06T 2207/20016; G06T 2207/30068; G06T 2207/30244; G06T 2211/416; G06T 3/0018; G06T 3/4015; G06T 3/4069; G06T 7/181; G06T 7/277; G06T 7/292; G06T 7/557; G06T 9/004; G02B 2027/0118; G02B 2027/0147; G02B 27/0075; G02B 13/18; G02B 27/0025; G02B 27/46; G02B 13/0045; G02B 13/006; G02B 3/04; G02B 13/06; G02B 13/004; G02B 27/0012; G02B 13/0015; G02B 13/0035; G02B 27/0172; G02B 13/001; G02B 9/12; G02B 9/34; G02B 1/00; G02B 27/4205; G02B 9/60; G02B 3/0087; G02B 7/04; G02B 5/1895; G02B 7/36; G02B 13/20; G02B 27/62; G02B 5/208; G02B 26/06; G02B 7/021; G02B 13/00; G02B 13/0065; G02B 13/003; G02B 13/22; G02B 13/0085; G02B 23/243; G02B 3/0056; G02B 13/0055; G02B 13/16; G02B 27/283; G02B 3/00; G02B 9/62; G02B 27/0037; G02B 5/1871; G02B 7/09; G02B 7/365; G02B 9/64; G02B 13/14; G02B 27/4211; G02B 3/0062; G02B 7/023; G02B 23/2484; G02B 3/005; G02B 5/201; G02B 13/04; G02B 13/24; G02B 13/008; G02B 13/12; G02B 27/52; G02B 5/20; G02B 5/3083; G02B 7/005; G02B 1/041; G02B 15/04; G02B 2027/0178; G02B 27/30; G02B 27/4216; G02B 3/0068; G02B 13/002; G02B 17/08; G02B 2027/0112; G02B 5/10; G02B 2003/0093; G02B 5/1876; G02B 7/08; G02B 2027/011; G02B 23/24; G02B 23/2438; G02B 23/2469; G02B 3/0037; G02B 3/14; G02B 6/02038; G02B 9/06; G02B 15/1421; G02B 2027/0174; G02B 27/1066; G02B 7/025; G02B 13/005; G02B 21/02; G02B 25/00; G02B 25/02; G02B 27/0068; G02B 3/10; G02B 13/146; G02B 15/00; G02B 3/0031; G02B 13/009; G02B 21/0004; G02B 3/0006; G02B 5/28; G02B 7/28; G02B 2027/012; G02B 27/149; G02B 5/32; G02B 6/0016; G02B 6/0035; G02B 7/14; G02B 7/38; G02B 13/02; G02B 13/26; G02B 17/0856; G02B 2027/0123; G02B 27/00; G02B 5/005; G02B 5/203; G02B 5/22; G02B 5/26; G02B 6/0018; G02B 6/0023; G02B 6/0026; G02B 6/003; G02B 7/02; G02B 15/163; G02B 25/001; G02B 30/56; G02B 5/1857; G02B 7/00; G02B 7/003; G02B 9/16; G02B 1/11; G02B 15/14; G02B 15/144111; G02B 17/0804; G02B 21/0056; G02B 23/2423; G02B 23/2453; G02B 27/0018; G02B 27/0101; G02B 3/06; G02B 9/04; G02B 13/0005; G02B 13/0095; G02B 15/143; G02B 17/0626; G02B 2027/0141; G02B 21/0084; G02B 21/14; G02B 26/125; G02B 27/1013; G02B 27/123; G02B 27/40; G02B 27/58; G02B 30/26; G02B 6/0076; G02B 7/34; G02B 1/002; G02B 1/04; G02B 15/142; G02B 15/1441; G02B 15/173; G02B 21/361; G02B 21/362; G02B 21/365; G02B 23/2407; G02B 26/10; G02B 27/0927; G02B 27/48; G02B 5/18; G02B 5/223; G02B 5/281; G02B 6/00; G02B 6/02052; G02B 7/102; G02B 7/346; G02B 9/14; G02B 1/10; G02B 13/08; G02B 15/145531; G02B 15/16; G02B 17/0605; G02B 17/0684; G02B 21/0016; G02B 23/12; G02B 26/0833; G02B 27/0081; G02B 27/01; G02B 27/34; G02B 27/42; G02B 27/4277; G02B 27/4283; G02B 3/08; G02B 6/0053;

G02B 7/004; G02B 7/028; G02B 15/167; G02B 15/177; G02B 17/002; G02B 17/023; G02B 17/0615; G02B 17/0621; G02B 19/0004; G02B 19/0014; G02B 19/0047; G02B 27/0138; G02B 23/02; G02B 23/06; G02B 23/14; G02B 23/2446; G02B 26/004; G02B 26/0841; G02B 26/101; G02B 27/0093; G02B 27/0176; G02B 27/18; G02B 27/28; G02B 27/286; G02B 27/4272; G02B 27/646; G02B 3/0075; G02B 3/02; G02B 5/003; G02B 5/1814; G02B 5/3058; G02B 6/005; G02B 6/0056; G02B 6/04; G02B 6/08; G02B 7/022; G02B 9/08; G02B 1/043; G02B 1/113; G02B 1/12; G02B 1/14; G02B 13/0075; G02B 15/143507; G02B 15/144515; G02B 15/1461; G02B 15/1465; G02B 17/008; G02B 17/061; G02B 17/0657; G02B 17/0808; G02B 2027/0116; G02B 2027/0125; G02B 2027/0127; G02B 2027/013; G02B 2027/0132; G02B 2027/0134; G02B 2027/014; G02B 2027/0145; G02B 2027/015; G02B 2027/0156; G02B 2027/0159; G02B 2027/0181; G02B 2027/0185; G02B 2027/0187; G02B 21/00; G02B 21/0096; G02B 21/04; G02B 21/241; G02B 21/244; G02B 2207/101; G02B 23/00; G02B 23/16; G02B 23/26; G02B 26/123; G02B 26/126; G02B 27/017; G02B 27/022; G02B 27/0955; G02B 27/0988; G02B 27/143; G02B 27/145; G02B 27/147; G02B 27/16; G02B 27/32; G02B 27/36; G02B 27/4227; G02B 27/44; G02B 27/64; G02B 3/0081; G02B 5/001; G02B 5/0278; G02B 5/04; G02B 5/08; G02B 5/0816; G02B 5/124; G02B 5/13; G02B 5/1828; G02B 5/1866; G02B 5/1885; G02B 5/205; G02B 5/30; G02B 5/3025; G02B 6/0006; G02B 6/0011; G02B 6/0288; G02B 6/06; G02B 6/124; G02B 6/29316; G02B 6/3532; G02B 6/42; G02B 6/4216; G02B 6/4298; G02B 7/008; G02B 7/026; G02B 7/182; G02B 7/40; G02B 9/02; G02B 9/36; G01M 11/0257; G01M 11/0292; G01M 11/04; G06V 40/19; G06V 30/10; G06V 40/193; G06V 40/197; G06V 30/142; G06V 20/69; G06V 10/52; G06V 10/758; G06V 30/148; G06V 30/162; G06V 10/28; G06V 10/30; G06V 10/44; G06V 10/751; G06V 10/764; G06V 10/987; G06V 40/1318; G06V 40/18; G06V 10/25; G06V 10/26; G06V 20/64; G06V 30/18019; G06V 30/20; G06V 30/413; G06V 40/14; G06V 10/10; G06V 10/14; G06V 10/143; G06V 10/242; G06V 10/806; G06V 10/809; G06V 10/82; G06V 10/85; G06V 20/584; G06V 2201/06; G03B 13/36; G03B 3/10; G03B 43/00; G03B 9/02; G03B 2219/045; G03B 17/14; G03B 5/00; G03B 17/12; G03B 17/17; G03B 21/14; G03B 2205/0046; G03B 5/02; G03B 7/20; G03B 9/04; G03B 9/10; G03B 21/005; G03B 21/142; G03B 17/561; G03B 13/32; G03B 9/06; G03B 17/00; G03B 19/04; G03B 30/00; G03B 7/10; G03B 7/085; G03B 13/20; G03B 13/34; G03B 15/00; G03B 19/07; G03B 21/147; G03B 2206/00; G03B 13/08; G03B 19/12; G03B 21/10; G03B 21/2026; G03B 21/2066; G03B 21/208; G03B 21/28; G03B 21/60; G03B 2205/0015; G03B 2205/0069; G03B 35/10; G03B 7/097; G03B 9/08; G03B 11/00; G03B 13/18; G03B 17/02; G03B 17/04; G03B 21/006; G03B 21/2073; G03B 21/62; G03B 2217/002; G03B 35/20; G03B 37/00; G03B 37/04; G03B 37/06; G03B 42/04; G03B 42/08; G03B 7/091

See application file for complete search history.

(56) References Cited

U.S. PATENT DOCUMENTS

| | | | | | |
|---|---|---|---|---|---|
| 5,581,631 | A | * | 12/1996 | Ortyn | G06V 20/69 382/128 |
| 5,629,766 | A | * | 5/1997 | Kaplan | G01M 11/0292 356/124.5 |
| 5,745,609 | A | * | 4/1998 | Nelson | G06T 5/73 358/468 |
| 5,760,387 | A | * | 6/1998 | Ortyn | G02B 7/36 348/E7.086 |
| 5,841,124 | A | * | 11/1998 | Ortyn | G02B 7/36 348/E7.086 |
| 5,877,489 | A | * | 3/1999 | Ortyn | H04N 7/183 348/E7.086 |
| 5,959,726 | A | * | 9/1999 | Riley | G01M 11/0292 356/124.5 |
| 6,243,158 | B1 | * | 6/2001 | Shiraishi | G03F 9/7088 356/399 |
| 6,419,671 | B1 | * | 7/2002 | Lemberg | A61B 3/12 606/4 |
| 7,075,633 | B2 | * | 7/2006 | Wegmann | G01M 11/0285 356/124 |
| 7,783,440 | B1 | * | 8/2010 | Lewis | H04N 17/002 702/77 |
| 12,019,242 | B2 | * | 6/2024 | Sun | G02B 27/0176 |
| 2003/0067595 | A1 | * | 4/2003 | Alderson | G01M 11/0292 356/124.5 |
| 2003/0103660 | A1 | * | 6/2003 | Gersten | G06T 5/73 382/280 |
| 2004/0008867 | A1 | * | 1/2004 | Fein | G01N 21/6458 359/326 |
| 2007/0126451 | A1 | * | 6/2007 | Chang | G01N 21/958 382/141 |
| 2007/0266287 | A1 | * | 11/2007 | Liu | G01M 11/0292 714/738 |
| 2008/0043273 | A1 | * | 2/2008 | Simske | H04N 1/00002 358/1.14 |
| 2011/0080487 | A1 | * | 4/2011 | Venkataraman | H04N 23/698 348/E5.024 |
| 2012/0013760 | A1 | * | 1/2012 | Parodi-Keravec | G01M 11/0264 348/222.1 |
| 2014/0354853 | A1 | * | 12/2014 | Venkataraman | H04N 23/55 348/239 |
| 2022/0276125 | A1 | * | 9/2022 | Ridgeway | G01M 11/0292 |
| 2022/0373460 | A1 | * | 11/2022 | Gaskey | G01N 21/8851 |
| 2022/0385848 | A1 | * | 12/2022 | Venkataraman | G06T 11/60 |

(56) References Cited

U.S. PATENT DOCUMENTS

2024/0200133 A1* 6/2024 Ghorbani ........... G01N 21/6458
2024/0231118 A1* 7/2024 Hazineh et al. ....... G01B 11/24

FOREIGN PATENT DOCUMENTS

| EP | 0848809 B1 | 6/2003 |
| JP | 2017083364 A | 5/2017 |
| KR | 1020200106301 A | 9/2020 |

OTHER PUBLICATIONS

European Search Report issued to patent application No. 21899009.1 on Sep. 17, 2024.

\* cited by examiner

OPTICAL RESOLUTION MEASUREMENT METHOD FOR OPTICAL DEVICES

CROSS-REFERENCE TO RELATED APPLICATIONS

This application claims benefit of U.S. Provisional Patent Application No. 63/117,578, filed Nov. 24, 2020, and U.S. Provisional Patent Application No. 63/189,562, filed May 17, 2021, which are herein incorporated by reference in their entirety.

BACKGROUND

Field

Embodiments of the present disclosure generally relate to optical devices. More specifically, embodiments described herein provide for a method of determining a modulation transfer function (MTF) of an optical device.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is determining the optical resolution of the optical devices to ensure that image quality standards are met. Current measurement systems for optical devices generally have low sampling rates across a large field of view as well as low throughput and fail to properly compensate for imperfections in image quality caused by cameras and image projectors within the measurement systems. Additionally, the measurement systems may be bulky and are susceptible to imperfections associated with the image projectors of the measurement system. Therefore, it is desirable to have a system and method for optical resolution measurement that will not be affected by imperfections associated with the image projector or camera and will have an improved throughput. Accordingly, what is needed in the art is a method of determining a MTF of an optical device.

SUMMARY

In one embodiment, a method is provided. The method includes projecting a baseline image of a pattern. The baseline image is projected from a light engine of a measurement system. The measurement system includes a stage disposed under the light engine. The stage is operable to have one or more optical devices disposed thereon. The light engine disposed above the stage projects the baseline image to the one or more optical devices. The measurement system further includes a detector oriented to be facing the stage. The method further includes capturing the baseline image. The baseline image is captured by the detector. The method further includes analyzing the baseline image to locate a first plurality of points on the baseline image. The first plurality of points are converted into a baseline function. The method further includes obtaining a baseline fast Fourier transform (FFT) of the baseline function and disposing the one or more optical devices on the stage. The method further includes projecting an image of the pattern from the light engine to the one or more optical devices and capturing the image. The image is captured by the detector. The method further includes analyzing the image to locate a second plurality of points on the image. The second plurality of points are converted into a function. The method further includes obtaining a function FFT corresponding to the image and determining an optical device modulation transfer function (MTF) of the one or more optical devices by comparing the baseline FFT and the function FFT corresponding to the image.

In another embodiment, a method is provided. The method includes projecting a baseline image of a pattern. The baseline image is projected from a light engine of a measurement system. The measurement system includes a stage disposed under the light engine. The stage is operable to have one or more optical devices disposed thereon. The light engine disposed above the stage projects the baseline image to the one or more optical devices. The measurement system further includes a detector oriented to be facing the stage. The method further includes obtaining a baseline fast Fourier transform (FFT) corresponding to the baseline image and projecting an image of the pattern to the one or more optical devices. The image is projected from the light engine to the one or more optical devices. The method further includes capturing the image. The image is captured by the detector. The method further includes obtaining a function FFT corresponding to the image and determining an optical device modulation transfer function (MTF) of the one or more optical devices by comparing the baseline FFT to the function FFT corresponding to the image.

In yet another embodiment, a method is provided. The method includes projecting a baseline image of a pattern from a light engine to a detector of a measurement system. The method further includes capturing the baseline image with the detector and analyzing the baseline image to determine a baseline fast Fourier transform (FFT). The method further includes projecting an image of the pattern from the light engine to one or more optical devices. The image is projected through the one or more optical devices to the detector. The method further includes capturing the image with the detector and analyzing the image. The method further includes determining an optical device modulation transfer function (MTF) of the one or more optical devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein provide for a method of determining a modulation transfer function (MTF) of an optical device. The method includes projecting a baseline image of a pattern. The baseline image is projected from a light engine of a measurement system. The measurement system includes a stage disposed under the light engine. The stage is operable to have one or more optical devices disposed thereon. The light engine disposed above the stage projects the baseline image to the one or more optical devices. The measurement system further includes a detector oriented to be facing the stage. The method further includes capturing the baseline image. The baseline image is captured by the detector. The method further includes analyzing the baseline image to locate a first plurality of points on the baseline image. The first plurality of points are converted into a baseline function. The method further includes obtaining a baseline FFT or a baseline MTF of the baseline function and disposing the one or more optical devices on the stage. The method further includes projecting an image of the pattern from the light engine to the one or more optical devices and capturing the image. The image is captured by the detector. The method further includes analyzing the image to locate a second plurality of points on the image. The second plurality of points are converted into a function. The method further includes obtaining a function FFT corresponding to the image or a function MTF corresponding to the image and determining an optical device MTF of the one or more optical devices by comparing the baseline FFT to the FFT of the function or by comparing the baseline MTF to the function MTF.

Figure 1A:
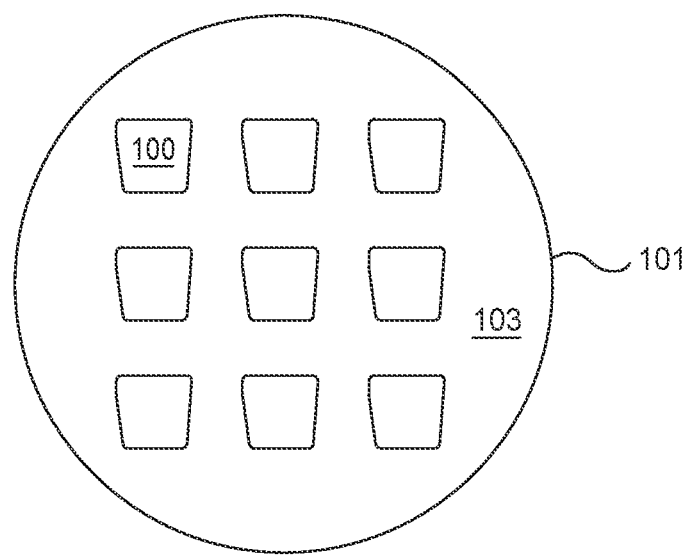
FIG. 1A is a perspective, frontal view of a substrate according to embodiments described herein.

FIG. 1A is a perspective, frontal view of a substrate 101 according to embodiments described herein. The substrate includes a plurality of optical devices 100 disposed on a surface 103 of the substrate 101. The optical devices 100 are waveguide combiners utilized for virtual, augmented, or mixed reality. In some embodiments, which can be combined with other embodiments described herein, the optical devices 100 are flat optical devices, such as metasurfaces.

The substrate 101 can be any substrate used in the art, and can be either opaque or transparent to a chosen laser wavelength depending on the use of the substrate 101. Additionally, the substrate 101 may be of varying shapes, thicknesses, and diameters. For example, the substrate 101 may have a diameter of about 150 mm to about 300 mm. The substrate 101 may have a circular, rectangular, or square shape. The substrate 101 may have a thickness of between about 300 µm to about 1 mm. Although only nine optical devices 100 are shown on the substrate 101, any number of optical devices 100 may be disposed on the surface 103.

Figure 1B:
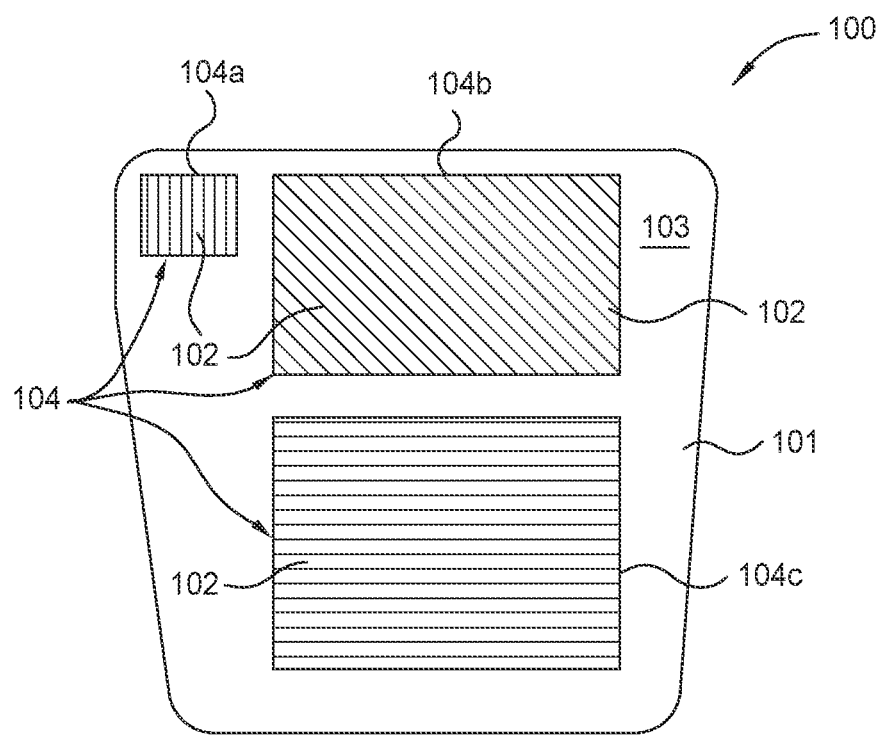
FIG. 1B is a perspective, frontal view of an optical device according to embodiments described herein.

FIG. 1B is a perspective, frontal view of an optical device 100. It is to be understood that the optical devices 100 described herein are exemplary optical devices and the other optical devices may be used with or modified to accomplish aspects of the present disclosure. The optical device 100 includes a plurality of optical device structures 102 disposed on a surface 103 of a substrate 101. The optical device structures 102 may be nanostructures having sub-micron dimensions, e.g., nano-sized dimensions. Regions of the optical device structures 102 correspond to one or more gratings 104, such as a first grating 104a, a second grating 104b, and a third grating 104c. In some embodiments, which can be combined with other embodiments described herein, the optical device 100 includes at least the first grating 104a corresponding to an input coupling grating and the third grating 104c corresponding to an output coupling grating. In some embodiments, which can be combined with other embodiments described herein, the optical device 100 also includes the second grating 104b corresponding to an intermediate grating. The optical device structures 102 may be angled or binary. The optical device structures 102 may have other shapes including, but not limited to, circular, triangular, elliptical, regular polygonal, irregular polygonal, and/or irregular shaped cross-sections.

In operation, the first grating 104a receives incident beams of light (a virtual image) having an intensity from a light source. The incident beams are split by the optical device structures 102 into T1 beams that have all of the intensity of the incident beams in order to direct the virtual image to the intermediate grating (if utilized) or the third grating 104c. In some embodiments, which can be combined with other embodiments described herein, the T1 beams undergo total-internal-reflection (TIR) through the optical device 100 until the T1 beams come in contact with the optical device structures 102 of the intermediate grating. The optical device structures 102 of the intermediate grating diffract the T1 beams to T−1 beams that undergo TIR through the optical device 100 to the optical device structures 102 of the third grating 104c. The optical device structures 102 of the third grating 104c outcouple the T−1 beams to the user's eye to modulate the field of view of the virtual image produced from the light source from the user's perspective and further increase the viewing angle from which the user can view the virtual image. In other embodiments, which can be combined with other embodiments described herein, the T1 beams undergo TIR through the optical device 100 until the T1 beams come in contact with the optical device structures 102 of the third grating 104c and are outcoupled to modulate the field of view of the virtual image produced from the light source.

To ensure that the optical devices 100 meet image quality standards, the optical device MTF of the optical devices 100 is obtained. In some embodiments, the optical device MTF provides image quality information related to image resolution and image contrast. Embodiments of the measurement system 200 described herein provide for the ability to obtain the optical device MTF with increased throughput and greater quality control. Additionally, embodiments of the measurement system 200 described herein provide for the ability to obtain the optical device MTF such that the measured optical device MTF is not strongly influenced by the imperfections of an image projector and/or a camera, such as distortion and astigmatism. Embodiments described herein allow for image quality separation between the optical device 100 and the measurement system 200, which may include imperfections attributable solely to a camera or projector. The MTF is a metric utilized to determine the ability of the optical devices 100 to transfer contrast at a particular resolution from an object to an image.

Figure 2:
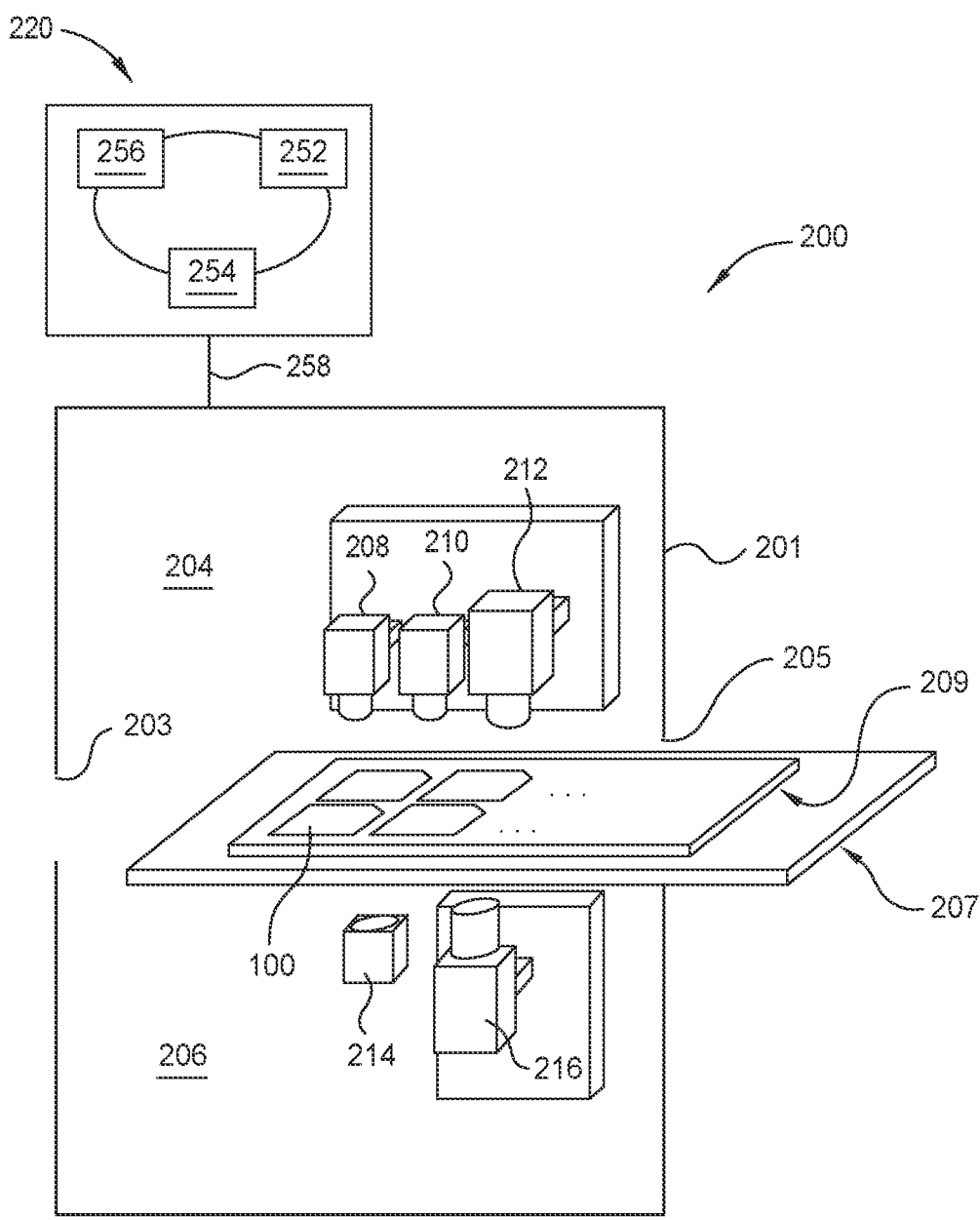
FIG. 2 is a schematic, cross-sectional view of the measurement system according to embodiments described herein.

FIG. 2 is a schematic, cross-sectional view of the measurement system 200 according to embodiments described herein. The measurement system 200 includes a body 201 with a first opening 203 and a second opening 205 to allow a stage 207 to move therethrough. The stage 207 is operable to move in an X-direction, a Y-direction, and a Z-direction in the body 201 of the measurement system 200. The stage 207 includes a tray 209 operable to retain the optical devices 100 (as shown herein) or one or more substrates 101.

The measurement system 200 is operable to project images such that the MTF of the optical device 100 can be determined. The stage 207 and the tray 209 may be transparent such that the MTF obtained utilizing the measurement system 200 is not impacted by the translucence of the stage 207 or the tray 209. The measurement system 200 is in communication with a controller 220 operable to control operation of measurement system 200 and the method 300 described herein.

The controller 220 is coupled to the measurement system 200. The controller 220 includes a processor 252, a memory 254, and support circuits 256 that are coupled to one another. The controller 220 is electrically coupled to the measurement system 200 via a wire 258. The processor 252 may be one of any form of general purpose microprocessor, or a general purpose central processing unit (CPU), each of which can be used in an industrial setting, such as a programmable logic controller (PLC), supervisory control and data acquisition (SCADA) systems, general purpose graphics processing unit (GPU), or other suitable industrial controller. The memory 254 is non-transitory and may be one or more of readily available memory such as random access memory (RAM), read only memory (ROM), or any other form of digital storage, local or remote. The memory 254 contains instructions, that when executed by the processor 252, facilitates execution of the method 300. The instructions in the memory 254 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

The measurement system 200 includes an upper portion 204 oriented toward a top side of the optical devices 100 and a lower portion oriented toward a bottom side of the optical devices 100. The upper portion 204 of the measurement system 200 includes an alignment camera 208, a light engine 210, and a reflection detector 212. The alignment camera 208 is operable to determine a position of the stage 207 and the optical devices 100. The light engine 210 is operable to illuminate the first grating 104a. In some embodiments, which can be combined with other embodiments described herein, the light engine 210 projects an image of a pattern to the first grating 104a. The reflection detector 212 detects outcoupled beams projected from the third grating 104c from the top side of the optical devices 100. The lower portion 206 of the first subsystem 202 includes a code reader 214 and a transmission detector 216. The code reader 214 is operable to read a code of the optical devices, such as a quick response (QR) code or barcode of an optical device 100. The code read by the code reader 214 may include instructions for obtaining the optical device MTF for various optical devices 100. The transmission detector 216 detects outcoupled beams projected from the third grating 104c though the bottom side of the optical devices 100.

The method 300 described herein includes illuminating the first grating 104a of an optical device 100 with the light engine 210 where the incoupled light undergoes TIR until it is outcoupled (e.g., reflected or transmitted) as images captured by the transmission detector 216. The images may correspond to red, green, and blue channels from the light engine 210. The images are processed as described in the method 300 to extract the MTF of the optical device 100.

Figure 3:
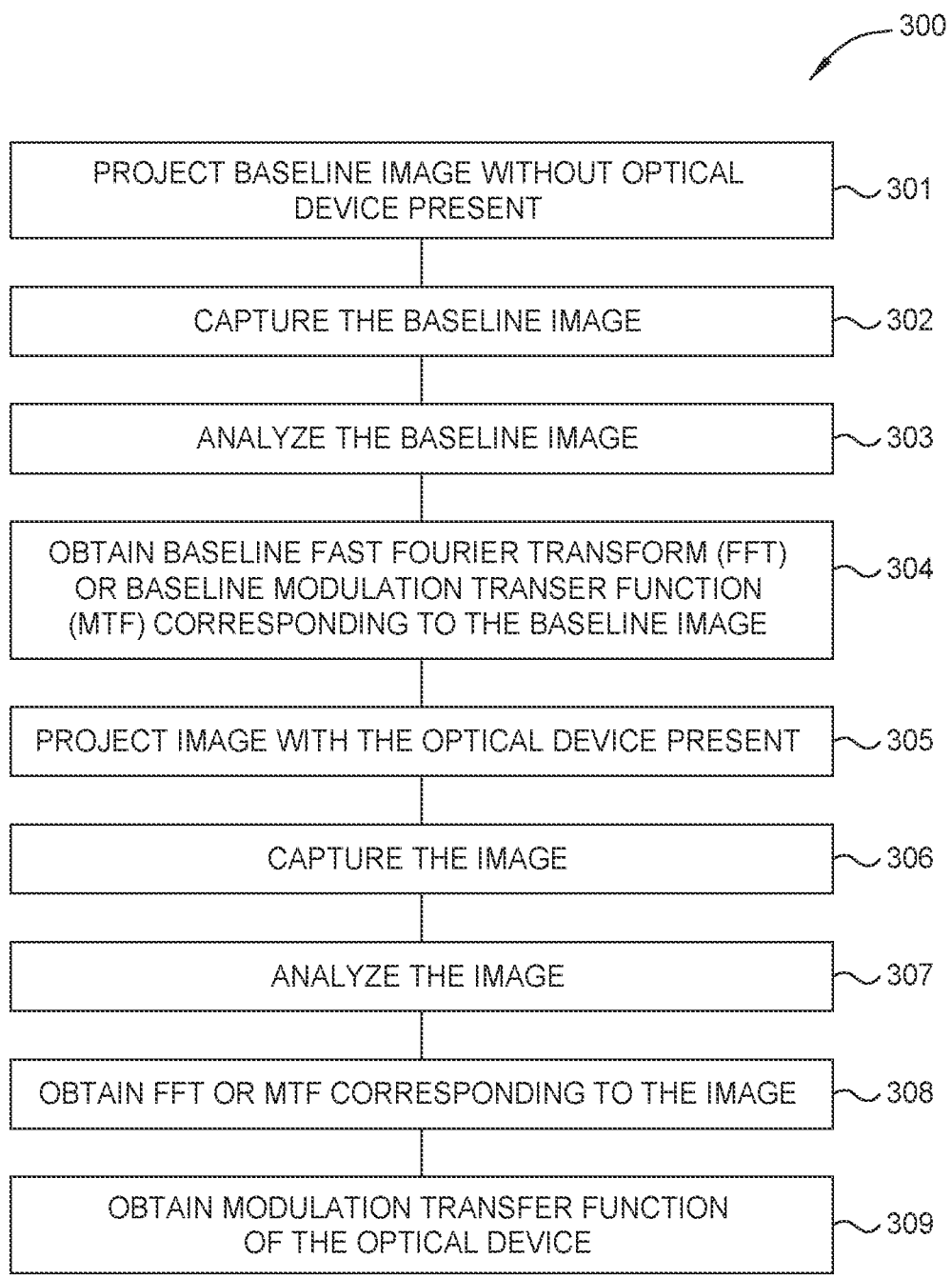
FIG. 3 is a flow diagram of a method for determining a modulation transfer function (MTF) of an optical device according to embodiments described herein.
Figure 4:
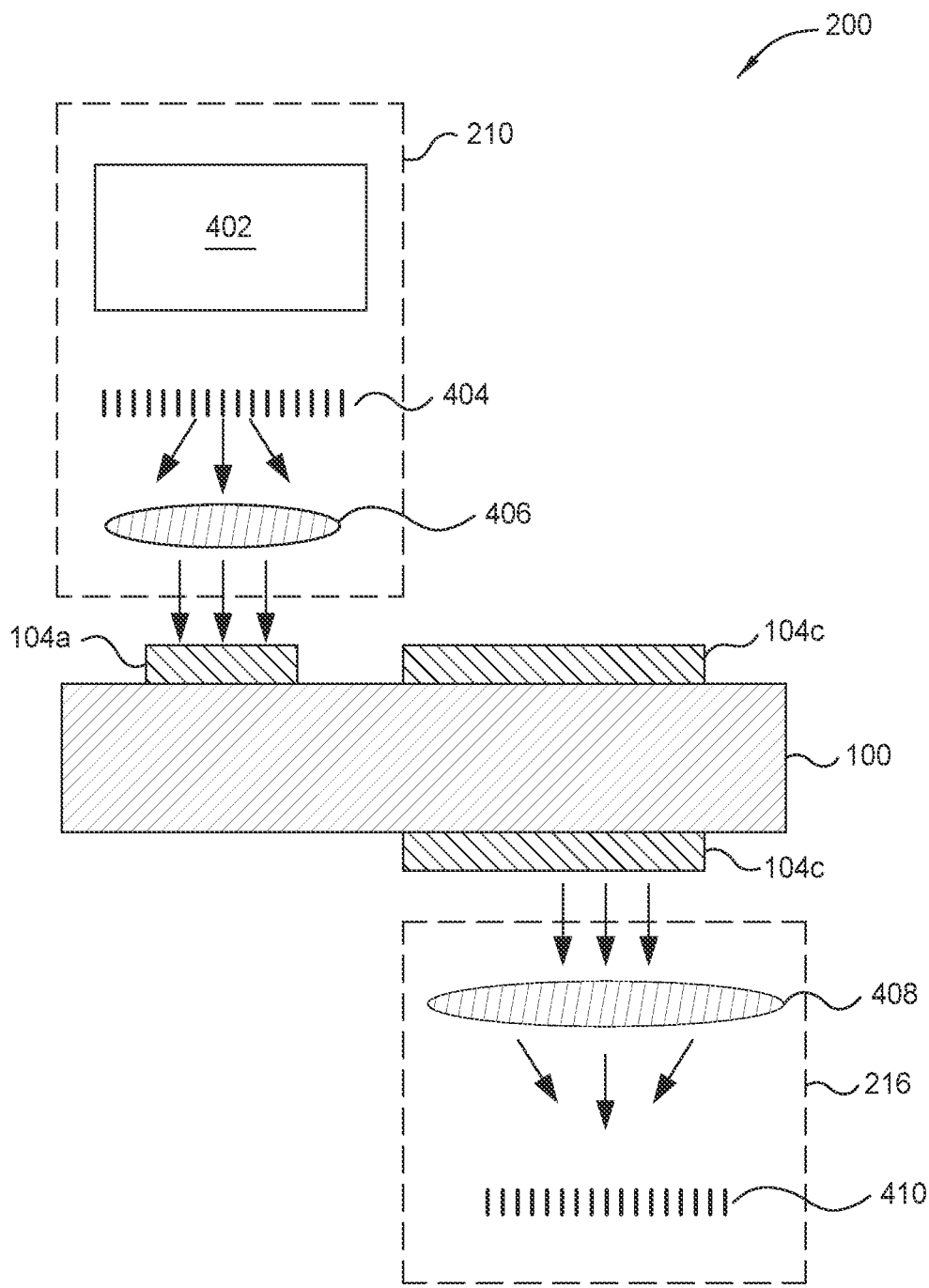
FIG. 4 is a schematic illustration of a system during a method for determining a modulation transfer function (MTF) of an optical device.

FIG. 3 is a flow diagram of a method 300 for determining an optical device MTF. FIG. 4 is a schematic illustration of a measurement system 200 during a method of for determining an optical device MTF. To facilitate explanation, the method 300 will be described with reference to the measurement system 200 shown in FIG. 4. The method 300 is operable to be performed in other measurement systems not described herein.

The measurement system 200 includes the light engine 210 and the transmission detector 216. In some embodiments, which can be combined with other embodiments described herein, the measurement system 200 also includes the reflection detector 212 (shown in FIG. 2). The light engine 210 includes a light source 402, a reticle 404, and a first lens 406. The light engine 210 may further include at least one of a quarter wave plate or linear polarizer. In some embodiments, which may be combined with other embodiments described herein, the light source 402 is configured to project red, green, and blue light. The reticle 404 may be a display. The transmission detector 316 includes a second lens 408 and a camera 410.

At operation 301, a baseline image is projected with the light engine 210 of the measurement system 200 without the optical device 100 present. The baseline image is projected after the light source 402 projects red, green, or blue light through reticle 404 to form a pattern. The baseline image is of the pattern. In some embodiments, which can be combined with other embodiments described, the light engine 210 is a high resolution image projector with a field of view (FOV) of about 10 degrees to about 120 degrees. The FOV of the light engine 210 is fixed or adjustable. The pattern is determined by the reticle 404. The reticle 404 may have one of a checkerboard pattern, line pair pattern, or a point matrix pattern. In some embodiments, which can be combined with other embodiments described, the reticle 404 is a high resolution patterned mask. The pattern of the reticle 404 may be formed via e-beam, ion-beam, or photo lithography. In other embodiments, which can be combined with other embodiments described, the light engine 210 is one of a LCOS, CLP, microLED, or OLED microdisplay.

At operation 302, the baseline image is captured. The baseline image may be captured by the transmission detector 216. The baseline image is of the pattern formed by the reticle 404. In some embodiments, which can be combined with other embodiments described herein, the transmission detector 216 includes the camera 410. The camera 410 is a high resolution camera. The camera 410 has a FOV of about 10 degrees to about 120 degrees. The FOV of the camera 410 is fixed or adjustable. The camera 410 may be a CCD or CMOS sensor. The camera 410 has a FOV sampling rate of about 1 degree per measurement.

At operation 303, the baseline image is analyzed. In some embodiments, which can be combined with other embodiments described herein, the baseline image is analyzed to locate a plurality of points on the baseline image. Each of the plurality of points may correspond to a different FOV across the baseline image. For example, each of the plurality of points may correspond to an edge of adjacent squares in a checkerboard pattern. The plurality of points are converted into a baseline function depending on the pattern formed. For example, the baseline function may be a point spread function, a line spread function, or an edge spread function.

At operation 304, a baseline FFT or a baseline MTF of the baseline function is obtained corresponding to the baseline image. To properly obtain the baseline FFT or the baseline MTF, the light intensity variation across the baseline image needs to be minimized. The light intensity variation across the baseline image can be reduced by adjusting the exposure time of the baseline image. The exposure time can be adjusted for each of the plurality of points of the baseline function.

At operation 305, as shown in FIG. 4, an image is projected with the light engine 210 of the measurement system 200 with the optical device 100 present. The image is projected after the light source 402 projects red, green, or blue light through the reticle 404 to form the pattern. The image includes the pattern. The pattern is projected to a first grating 104a and undergoes TIR through the optical device 100 until the pattern is outcoupled from a third grating 104c. In some embodiments, which can be combined with other embodiments described herein, the optical device 100 may include a surface relief grating based waveguide combiner, a volume hologram based waveguide combiner, a bird bath waveguide combiner, a partial reflective mirror array combiner, or a free from optics combiner. The pattern is determined by the reticle 404. The reticle 404 may have one of a checkerboard pattern, a line pair pattern, or a point matrix pattern. In some embodiments, which can be combined with other embodiments described, the reticle 404 is a high resolution patterned mask.

At operation 306, the image of the optical device 100 is captured. The image may be captured by the transmission detector 216. The image is outcoupled from the third grating 104c on a bottom side of the optical device 100 towards the transmission detector 216. The image is of the pattern determined by the reticle 404. In some embodiments, which can be combined with other embodiments described herein, the transmission detector 216 includes the camera 410. In some embodiments, which can be combined with other embodiments described herein, the reflection detector 212 may capture the image of the pattern. For example, when the image is outcoupled from a top side of the optical device 100, the reflection detector 212 may partially capture or fully capture the image.

At operation 307, the image is analyzed. In some embodiments, which can be combined with other embodiments described herein, the image is analyzed to locate a plurality of points. Each of the plurality of points may correspond to a different FOV across the image. For example, each of the plurality of points may correspond to an edge of adjacent squares in a checkerboard pattern. The plurality of points are converted into a function depending on the pattern. For example, the function may be a point spread function, a line spread function, or an edge spread function. In some embodiments, which can be combined with other embodiments described herein, the function corresponds to the baseline function. For example, when the baseline function is a point spread function, the function will also be a point spread function.

At operation 308, a function FFT or a function MTF of the function is obtained corresponding to the image. To properly obtain the function FFT or the function MTF corresponding to the image, the light intensity variation across the image needs to be minimized. The light intensity variation across the image can be reduced by adjusting the exposure time of the image. The exposure time can be adjusted for each of the plurality of points of the function.

At operation 309, the optical device MTF is obtained. The optical device MTF is obtained by dividing the function FFT corresponding to the image by the baseline FFT or by dividing the function MTF by the baseline MTF. The optical device MTF obtained with the method 300 is less prone to be affected to imperfections of the light engine 210. For example, astigmatism and distortion present in the light engine 210 are filtered out by obtaining the baseline FFT or the baseline MTF separately from the function FFT or the function MTF corresponding to the image in order to isolate and compensate for present imperfections. In some embodiments, which can be combined with other embodiments described herein, the MTF of the full FOV of the optical device 100 is captured using the image of the optical device.

In summation, a method of determining a MTF of an optical device is described herein. The method described herein includes projecting a baseline image of a pattern from a light engine to a detector. The baseline image is analyzed to determine a baseline function. A baseline FFT or a baseline MTF of the baseline function is obtained. The method further includes projecting an image of the pattern from the light engine to one or more optical devices. The pattern is outcoupled from the one or more optical devices to the detector. The image is analyzed to determine a function. A function FFT or a function MTF is obtained corresponding to the image. An optical device MTF is determined by comparing the baseline FFT to the function FFT or by comparing the baseline MTF to the function MTF. The method described herein will provide for optical device MTF measurements without being affected by potential imperfections of the light engine. Additionally, due to the high resolution image projector and high resolution camera with a FOV of about 10 degrees to about 120 degrees each, the methods provided herein capture the MTF data for the full, dense FOV of the optical device with one image (e.g., parallel processing of all FOV angles in one shot), thus improving throughput for optical device fabrication and quality control. Overall, methods provided herein allow for compensation of imperfections in image quality caused by the image projector and the camera, by allowing for isolation of the optical device MTF. In this manner, quality degradation can be avoided and a higher throughput is achieved.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
projecting a baseline image of a pattern, the baseline image projected from a light engine of a measurement system, wherein the measurement system comprises:
   a stage disposed under the light engine, the stage operable to have one or more optical devices disposed thereon, wherein the light engine disposed above the stage projects the baseline image to the one or more optical devices; and
   a detector oriented to be facing the stage;
capturing the baseline image, the baseline image captured by the detector;
analyzing the baseline image to locate a first plurality of points on the baseline image, the first plurality of points converted into a baseline function;
obtaining a baseline fast Fourier transform (FFT) of the baseline function;
disposing the one or more optical devices on the stage;
projecting an image of the pattern, the image projected from the light engine to the one or more optical devices;
capturing the image, the image captured by the detector;
analyzing the image to locate a second plurality of points on the image, the second plurality of points converted into a function;
obtaining a function FFT corresponding to the image; and
determining an optical device modulation transfer function (MTF) of the one or more optical devices, the optical device MTF determined by comparing the baseline FFT to the function FFT corresponding to the image.

2. The method of claim 1, further comprising adjusting an exposure time of the baseline image when capturing the baseline image.

3. The method of claim 1, further comprising adjusting an exposure time of the image when capturing the image.

4. The method of claim 1, wherein the baseline function and the function are one of a point spread function, a line spread function, or an edge spread function.

5. The method of claim 1, wherein determining the optical device MTF includes dividing the function FFT corresponding to the image by the baseline FFT.

6. The method of claim 1, further comprising capturing the image with a reflection detector oriented to be facing the stage.

7. The method of claim 1, wherein the light engine is a high resolution image projector with a field of view (FOV) of about 10 degrees to about 120 degrees.

8. The method of claim 1, wherein one or more of each the first plurality of points and each of the second plurality of points represent an edge of adjacent quadrilaterals in a checkerboard pattern.

9. A method, comprising:
projecting a baseline image of a pattern, the baseline image projected from a light engine of a measurement system, the measurement system having:
   a stage disposed under the light engine, the stage operable to have one or more optical devices disposed thereon, wherein the light engine disposed above the stage projects the baseline image to the one or more optical devices; and
   a detector oriented to be facing the stage;
capturing the baseline image, the baseline image captured by the detector;
obtaining a baseline fast Fourier transform (FFT) corresponding to the baseline image;
projecting an image of the pattern to the one or more optical devices, the image projected from the light engine to the one or more optical devices;
capturing the image, the image captured by the detector;
obtaining a function FFT corresponding to the image; and
determining an optical device modulation transfer function (MTF) of the one or more optical devices, the optical device MTF determined by comparing the baseline FFT to the function FFT corresponding to the image.

10. The method of claim 9, further comprising adjusting an exposure time of the baseline image when capturing the baseline image.

11. The method of claim 9, wherein the light engine is a high resolution image projector with a field of view (FOV) of about 10 degrees to about 120 degrees.

12. The method of claim 9, wherein one or more of each of a first plurality of points on the baseline image and each of a second plurality of points in the image of the pattern represent an edge of adjacent quadrilaterals in a checkerboard pattern.

13. The method of claim 9, further comprising capturing the image with a reflection detector oriented to be facing the stage.

14. The method of claim 9, wherein determining the optical device MTF of the one or more optical devices includes dividing the function FFT corresponding to the image by the baseline FFT.

15. A method, comprising:
projecting a baseline image of a pattern from a light engine to a detector of a measurement system;
capturing the baseline image with the detector;
analyzing the baseline image, wherein analyzing the baseline image comprises determining a baseline fast Fourier transform (FFT) or a baseline optical device modulation transfer function (MTF);
projecting an image of the pattern from the light engine to one or more optical devices, the image projected through the one or more optical devices to the detector;
capturing the image with the detector;
analyzing the image, wherein analyzing the image comprises determining a function FFT corresponding to the image or a function MTF; and
determining an optical device MTF of the one or more optical devices, wherein the determining the optical device MTF comprises:
   dividing the function MTF by the baseline MTF; or
   dividing the function FFT by the baseline FFT.

16. The method of claim 15, further comprising adjusting an exposure time of the baseline image when capturing the baseline image.

17. The method of claim 15, wherein the light engine is a high resolution image projector with a field of view (FOV) of about 10 degrees to about 120 degrees.

18. The method of claim 15, further comprising a stage disposed under the light engine and capturing the image with a reflection detector oriented to be facing the stage.

19. The method of claim 1, wherein the stage is transparent.

20. The method of claim 19, wherein:
projecting the baseline image of the pattern comprises projecting the baseline image of the pattern while the one or more optical devices are not disposed on the stage; and projecting the image of the pattern to the one or more optical devices comprises projecting the image of the pattern to the one or more optical devices while the one or more optical devices are disposed on the stage.

* * * * *